US011980978B2

United States Patent
Knoener

(10) Patent No.: US 11,980,978 B2
(45) Date of Patent: *May 14, 2024

(54) SYSTEM AND METHOD TO CONTROL TWO WIRE FEED MOTORS

(71) Applicant: ILLINOIS TOOL WORKS INC., Glenview, IL (US)

(72) Inventor: Craig Steven Knoener, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/903,530

(22) Filed: Sep. 6, 2022

(65) Prior Publication Data

US 2023/0226634 A1 Jul. 20, 2023

Related U.S. Application Data

(63) Continuation of application No. 16/049,168, filed on Jul. 30, 2018, now Pat. No. 11,433,470.

(51) Int. Cl.
*B23K 9/12* (2006.01)
*B21C 47/34* (2006.01)
*B23K 9/133* (2006.01)

(52) U.S. Cl.
CPC ............ *B23K 9/125* (2013.01); *B21C 47/345* (2013.01); *B23K 9/1333* (2013.01); *B23K 9/1336* (2013.01)

(58) Field of Classification Search
CPC .... B21C 47/345; B23K 9/125; B23K 9/1333; B23K 9/1336
See application file for complete search history.

(56) References Cited

U.S. PATENT DOCUMENTS

| | | | |
|---|---|---|---|
| 8,604,386 B2 * | 12/2013 | Mehn | B65H 51/30 219/136 |
| 2017/0189982 A1 * | 7/2017 | Hsu | B23K 9/173 |

FOREIGN PATENT DOCUMENTS

JP 02255273 A * 10/1990

* cited by examiner

*Primary Examiner* — Dana Ross
*Assistant Examiner* — Joe E Mills, Jr.
(74) *Attorney, Agent, or Firm* — McAndrews, Held & Malloy, Ltd.

(57) ABSTRACT

A system for controlling multiple wire feed motors for use in a welding-type system including a push motor controlled to operate at a target wire feed speed and a pull motor disposed in a welding torch controlled to apply a target torque to the fed welding wire. Such a system eliminates shaving and bird nesting of welding wire.

20 Claims, 5 Drawing Sheets

SYSTEM AND METHOD TO CONTROL TWO WIRE FEED MOTORS

CROSS REFERENCE TO RELATED APPLICATIONS

This application is a Continuation Application of U.S. patent application Ser. No. 16/049,168 entitled "System And Method To Control Two Wire Feed Motors" filed Jul. 30, 2018, which is herein incorporated by reference in its entirety.

BACKGROUND

The present disclosure relates to welding systems, and, more particularly to welding wire feeding systems including multiple wire feed motors. Conventional systems using multiple wire feed motors may require the use of, empirical settings, require constant calibration, or may require specialized equipment to prevent bird-nesting or shaving of the welding wire. Therefore, systems and methods to feed a welding wire without the need of using empirical settings, constant calibration, or specialized equipment are desirable.

SUMMARY

Apparatus, systems, and methods are disclosed for controlling multiple wire feed motors, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
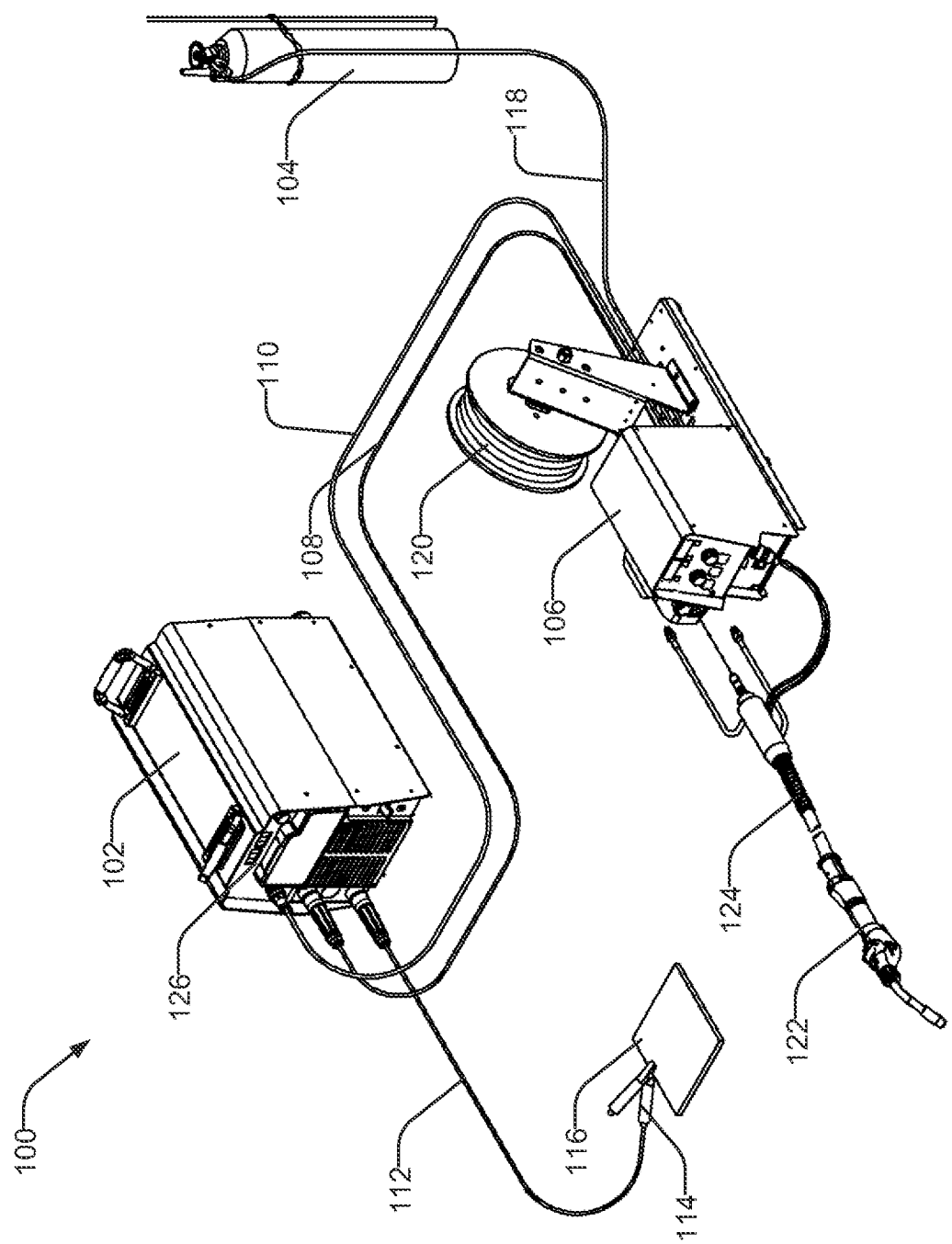
FIG. 1 is an illustration of an example welding-type system in accordance with aspects of this disclosure.

Welding is a process that has become increasingly ubiquitous in various industries and applications. While such processes may be automated in certain contexts, a large number of applications continue to exist for manual welding operations. Such welding operations rely on a variety of types of equipment to ensure the supply of welding consumables (e.g., wire feed, shielding gas, etc.) is provided to the weld in an appropriate amount at the desired time. For example, metal inert gas (MIG) welding typically relies on a wire feeding system to ensure that a proper wire feed reaches a welding torch. Some such wire feeding systems rely on a push-pull system in which a push motor and a pull motor cooperate to pull the wire from the wire spool, push the wire into the welding torch, and pull the wire from the welding torch a desired wire feed rate.

Feeding aluminum wire through long welding torches can be particularly challenging. In such push-pull wire feeding systems, three traditional methods have been used to feed aluminum welding wire. In a first method, an operator uses a relatively short welding torch with a relatively large 5XXX diameter aluminum wire and a narrow gun liner. The welding torch cable length may be 10 feet long or shorter. The wire diameter may be 0.047." The 5XXX alloy is a stiffer alloy than the more commonly used 4XXX and has a high column strength. With this combination, pushing the aluminum wire with a traditional wire feed system (without a pull motor located in the welding torch) may be adequate.

In a second conventional method, a pull motor is added to the remote end of the welding torch, (a "push-pull" gun). The wire feeder's internal motor "pushes" the welding wire into the torch, and the remote motor in the welding torch "pulls" the welding wire out of the welding torch. In traditional systems, both motors may be brushed DC motors controlled with independent constant velocity control loops. If the motors are not properly coordinated, then the wire in the welding torch will either be under compression (leading to "bird nesting") or under too much tension (leading to shaved wire). Bird nesting occurs when the push motor operates at a faster speed than the pull motor. The welding wire continues to compress until the column strength of the welding wire exceeds its failure point, resulting in wire accumulation as the reel continues to unwind wire and the wire does not feed through to the torch. The location of the bird nesting is typically the point when the welding wire leaves the push motor and enters the welding torch. Shaving occurs when the push motor is running slower than the pull motor. The welding wire is placed under too much tension. This excessive tension causes the aluminum welding wire to rub against the steel liner. The steel liner becomes a file and files small shavings off the aluminum welding wire.

In some systems, a tachometer is included in the internal motor, but not on the remote motor. In such systems where the remote motor does not have a tachometer, a combination of empirical settings are labeled on the welding torch and used for calibration. Set up Push Motor Torque (SUP) is a value empirically determined for each push-pull gun and when a gun is manufactured, this empirical value is printed on the gun. An operator then enters the SUP into the welder via the welder's user interface. In some welders, the SUP is used to adjust the over-torque limit of the remote motor, preventing the wire from being put under too much tension, therefore limiting shaving. In other welders, the SUP is used as an offset and/or gain for the wire speed command for the remote motor to better synchronize the remote motor with the internal motor. These SUP settings may only be valid as long as the conditions are consistent.

A third conventional method includes using a push-pull gun, but replacing the internal brushed DC motor in the wire feeder with an AC induction torque motor. This third method resolves the issue of the push motor and the pull motor operating at different speeds, but is a specialty welder because the wire feeder cannot be used to run a traditional steel wire using only the internal motor.

Therefore, a push-pull system is desirable for feeding welding wire, and particularly aluminum welding wire, that does not require the use of empirical settings, constant calibration, or specialty equipment. As will be explained in further detail below, the wire feeder of the present disclosure may house a push motor, coupled for example, to a tachometer or other speed sensor and/or a current sensor. The push motor may be a brushed DC motor. The wire feeder may also include control circuitry coupled to the motor and/or sensors. The control circuitry monitors the detected current and/or speed and alters one or more control parameters of the motor to maintain an operating speed of the push motor at a substantially fixed value determined by a received input command, as described in more detail below.

During operation of the disclosed welding system, the components of the welding system may cooperate to feed welding wire to the welding operation via the welding torch via a push-pull feed system. To that end, the welding torch includes a pull motor to feed welding wire to the welding operation. The pull motor may be a brushed DC motor. In the present disclosure, a current sensor monitors a current through the pull motor. The control circuitry is coupled to the pull motor and the current sensor to control the torque of the pull motor. As armature current of the pull motor is proportional to the torque of the pull motor, controlling the current through the armature of the pull motor controls the torque of the pull motor.

Disclosed example welding systems include a wire feeder comprising a push motor configured to feed a welding wire to a welding torch having a pull motor configured to pull the welding wire; a sensor configured to output a feedback signal representative of a current through the pull motor; and control circuitry. The control circuitry is configured to, during a welding operation: control the pull motor to operate at a target torque based on the feedback signal; and control the push motor to operate at a target speed.

In some example welding systems both the push motor and the pull motor are brushed DC motors. In some example welding systems, the control circuitry is configured to control a power level applied to the push motor based on a second feedback signal indicative of the push motor speed.

Some example welding systems further include a tachometer coupled to the push motor. In some example systems including a tachometer coupled to the push motor, the control circuitry is configured to receive the second feedback signal from the tachometer.

In some example welding systems, the control circuitry is configured to receive an input indicating a welding wire type and adjust the target torque based on the input.

Some example welding systems further include a welding-type power supply configured to provide power to the push motor and the pull motor and provide welding-type power to the welding torch.

Disclosed example welding systems include a wire feeder comprising a push motor configured to feed a welding wire to a welding torch having a pull motor configured to pull the welding wire; a sensor configured to output a feedback signal representative of a current through the pull motor; and control circuitry. The control circuitry is configured to: receive a start command; in response to receiving the start command, start the pull motor at a constant speed; after a first delay following receiving the start command, control the pull motor to operate at a target torque based on the feedback signal; and after a second delay following receiving the start command, start and control the push motor at a target push motor speed.

In some example welding systems, the control circuitry is further configured to: receive an end command; and in response to receiving the end command: turn off the push motor; and after a third delay following turning off the push motor, turn off the pull motor.

In some example welding systems, the control circuitry is further configured to: receive a second feedback signal indicative of the push motor speed; and adjust a power level applied to the push motor in response to the feedback signal to maintain the target push motor speed.

In some example welding systems, the control circuitry is configured to control an armature current of the pull motor to control the pull motor to operate at the target torque.

In some example welding systems, the control circuitry includes a first controller configured to control the push motor, and a second controller to control the pull motor.

In some example welding systems, the control circuitry is further configured to receive an input indicating a desired wire feed speed prior to receiving the start command, wherein the target speed is based on the input. In some example welding systems, the control circuitry is further configured to: after the second delay, receive a second command indicating a desired wire feed speed, and adjust the target speed in response to receiving the second command.

Disclosed example methods for feeding welding wire include: controlling, via control circuitry, a push motor to operate at a target speed, wherein the push motor feeds the welding wire to a welding torch having a pull motor that pulls the welding wire; providing, via a sensor, a feedback signal representative of a current through the pull motor; and controlling, via the control circuitry, the pull motor to operate at a target torque based on the feedback signal.

Some example methods for feeding welding wire further include providing, via a second sensor, a second feedback signal representative of the push motor speed; and controlling, via the control circuitry, a power level applied to the push motor based on a second feedback signal indicative of the push motor speed.

Some example methods for feeding welding wire further include receiving, via the control circuitry, an input indicating a desired wire feed speed; and adjusting, via the control circuitry, the target speed based on the input.

Some example methods for feeding welding wire further include receiving, via the control circuitry, an input indicating a welding wire type; and adjusting, via the control circuitry, the target torque based on the input, FIG. 1 illustrates an exemplary welding-type system 100 which powers, controls, and provides supplies to a welding operation. The welding system 100 has a welding-type power supply 102, a gas cylinder 104, and a wire feeder 106. The wire feeder 106 is electrically connected to the welding-type power supply 102 via one or more cables, which may include a power lead 108 and a control cable 110. A work lead 112 couples the welding-type power supply 102 to a work clamp 114 that connects to a workpiece 116, thereby completing the circuit between the welding-type power supply 102 and the wire feeder 106 during a welding operation. It should be noted that the one or more cables need not be bundled together in some embodiments and/or may include additional data, power, or other suitable leads. Further, the gas cylinder 104 is connected to the wire feeder 106 via a gas conduit 118 to supply gas for an arc-welding process.

In the illustrated welding system 100, the wire feeder 106 is a bench-style wire feeder assembly that unspools welding wire from a spool 120 to feed welding wire to the welding torch 122 via one or more cables 124. The one or more cables 124 may include a data cable, a wire feed lead, a power cable, and/or a gas conduit, any two or more of which may be combined into the same cable.

While a bench-style wire feeder assembly is illustrated as external to the welding-type power supply 102, in other examples the wire feeder 106 may be integrated with (e.g., internal to) an enclosure of the welding-type power supply 102.

The welding-type power supply 102 may have a control panel 126 through which an operator may control the supply of welding materials, such as gas flow, wire feed, and so forth to the welding torch 122. To that end, the control panel 126 includes input or interface devices, such as knob that the operator may use to adjust welding parameters (e.g., voltage, current, etc.).

As will be explained in relation to FIG. 2, the wire feeder 106 may house a push motor, coupled for example, to a tachometer or other speed sensor and/or a current sensor. The push motor may be a brushed DC motor. The wire feeder 106 may also include control circuitry coupled to the motor and/or sensors. The control circuitry monitors the detected current and/or speed and alters one or more control parameters of the motor to maintain an operating speed of the brush motor at a substantially fixed value determined by a received input command, as described in more detail below.

During operation of the welding system 100, the components of the welding system 100 may cooperate to feed welding wire to the welding operation via the welding torch 122 via a push-pull feed system. To that end, the welding torch 122 includes a pull motor to feed welding wire to the welding operation. The pull motor may be a brushed DC motor. In the present disclosure, the wire feeder 106 may also include a current sensor to monitor a current through the pull motor 122. The control circuitry of the wire feeder 106 is coupled to the pull motor and the current sensor to control the torque of the pull motor. As armature current of the pull motor is proportional to the torque of the pull motor, controlling the current through the armature of the pull motor controls the torque of the pull motor.

Figure 2:
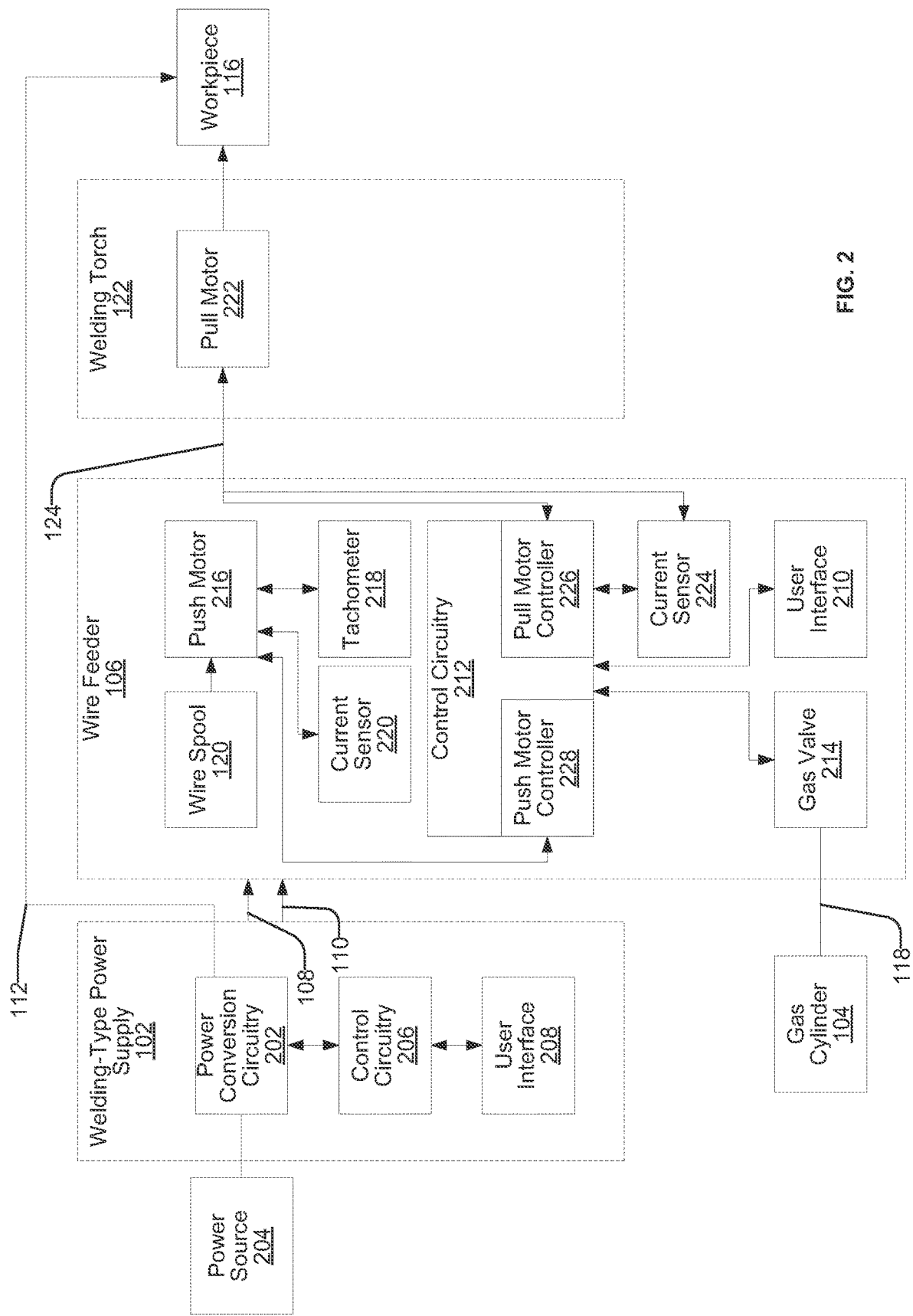
FIG. 2 is a block diagram of an example welding-type system in accordance with aspects of this disclosure.

FIG. 2 is a block diagram illustrating an example implementation of the welding-type power supply 102, the wire feeder 106, and the welding torch 122. The welding-type power supply 102 and the wire feeder are coupled to one another via a power lead 108 and a control cable 110, and the welding torch 122 is coupled to the wire feeder 106 via the cables 124. The cables 124 connecting the wire feeder 106 to the welding torch 122 may include a data cable, a wire feed lead, a power cable, and/or a gas conduit.

In the illustrated embodiment of FIG. 2, the welding-type power supply 102 includes power conversion circuitry 202 coupled to a source of electrical power, for example an AC power source 204. The power source 204 may be, for example, the AC power grid, an engine/generator set, a combination thereof, or other alternative sources. The welding-type power supply 102 also includes control circuitry 206. The control circuitry 206 may be coupled to a user interface 208 that allows fir data settings to be selected by an operator. The user interface 208 may allow for selection of settings such as the weld process, the type of wire to be used, voltage and current settings, and so forth.

During operation, the control circuitry 206 operates to control generation of welding power output that is applied to the welding wire for carrying out the desired welding operation. To that end, the control circuitry 206 is coupled to power conversion circuitry 202. The power conversion circuitry 202 is adapted to create the output power that will ultimately be applied to the welding wire at the welding torch 122. Various power conversion circuits may be employed, including choppers, boost circuitry, buck circuitry, inverters, converters, and so forth. The configuration of such circuitry may be of types generally known in the art. Accordingly, when operated, the power conversion circuitry 202 and the control circuitry 206 of the welding-type power supply 102 are configured to output power and data via cables 108 and 110, respectively, to the wire feeder 106 to control and power the welding operation at the welding torch 122.

The illustrated wire feeder 106 includes a user interface 210, control circuitry 212, gas valve 214, the wire spool 120, a push motor 216, a tachometer 218, and a current sensor 220. The gas valve 214 is connected to the gas cylinder 104 via gas conduit 118.

During operation, the control circuitry 212 allows for wire feed speeds to be controlled in accordance with operator selections indicated via the user interface 210 and permits these settings to be fed back to the control circuitry 206 of the welding-type power supply 102 via data conduit 110. For example, the user interface 210 may allow for selection of such weld parameters as the process, the type of wire utilized, current, voltage or power settings, and so forth. The user interface 210 may also allow the operator to choose a type of gas desired for the given application or the control circuitry 212 may determine an appropriate gas type based on one or more operator selections. To that end, the control circuitry 212 is also coupled to the gas control valve 214, which regulates the flow of shielding gas to the welding torch 122 in accordance with the selections chosen by the operator. In general, such gas is provided at the time of welding and may be turned on immediately preceding the weld and for a short time following the weld.

The control circuitry 212 also controls the speed of the push motor 216. To establish a wire feed from the wire spool 120 to the welding torch 122, welding wire is unspooled from the spool 120 and is progressively fed to the gun 122 at a desired speed as established by the push motor 216. For example, the push motor 216 may engage with feed rollers to push wire from the wire feeder 106 towards the gun 122. In practice, one of the wire feed rollers may be mechanically coupled to the push motor 216 and rotated by the motor 216 to drive the wire from the wire feeder 26, while the mating roller may be biased towards the wire to maintain good contact between the two rollers and the wire. Some systems may include multiple rollers of this type.

Such a wire feed process is controlled by the control circuitry 212 of the wire feeder, Which exhibits control over one or more operating parameters of the push motor 216. In accordance with embodiments of the present invention, the tachometer 218 is operated either continuously or periodically at desired intervals to measure the operational rotational speed of a shaft of the push motor 216 throughout its operation and to provide such feedback to the control circuitry 212. Similarly, the current sensor 220 may also be operated continuously or at predetermined time intervals to measure a current level of the push motor 216 and to provide such feedback to the control circuitry 212. The control circuitry 212 may utilize the received feedback from the tachometer 218 and current sensor 220 in conjunction with a commanded speed determined, for example, via parameters received via user interface 210 to regulate a speed of the push motor 216.

In the illustrated embodiment, the wire feeder 106 is coupled to the welding torch 122 via one or more cables 124. The cables 124 may include a data cable, a wire feed lead, a power cable, and a gas conduit. The welding torch 122 includes a pull motor 222. The wire feeder 106 further includes a current sensor 224 coupled to monitor the armature current of the pull motor 222. The control circuitry 212 controls operation of the pull motor 222 to operate at a constant torque via monitoring the pull motor 222 current via feedback from the current sensor 224. In some examples, control circuitry 212 includes a pull motor controller 226 for controlling the pull motor 222, and a push motor controller 228 for controlling the push motor 216.

In the illustrated embodiment of FIG. 2, as will be described in more detail below, the push motor 216 is controlled via control circuitry 212 to operate based on a target velocity (e.g., a constant velocity, a set point velocity, etc.). The target velocity (e.g., in inches per minute, or other unit of length per unit time) may be set by an operator, for example via the welding-type power supply 102 user interface 208 or the wire feeder 106 user interface 210. The control circuitry 212 monitors and the speed of the push motor 216 via a speed sensor, for example the tachometer 218, and controls the push motor 216 to maintain a target speed. The push motor 216 is responsible for delivering wire to the welding torch 122 with a target (e.g., constant) velocity, and therefore controls the speed of the welding wire through the welding torch 122. With the tachometer 218 supplying feedback, and since the push motor 216 is solely responsible for maintain the target speed, no calibration between the push motor 216 and the pull motor 222 is required.

The pull motor 222 is controlled by the control circuitry 212 to keep a target amount of tension in the welding wire in the welding torch 122 between the push motor 216 and the pull motor 222. The target tension is maintained by actively controlling the motor torque of the pull motor 222. Control signals may be sent, for example, via a data cable of the cables 124 connecting the wire feeder 106 and the welding torch 122, The control circuitry 212 monitors the pull motor 222 current (i.e. the current through the pull motor 222 armature) via the current sensor 224, which is proportional to the pull motor 222 torque. When actively controlling the pull motor 222 torque, there is no need to calibrate the speed of the pull motor 222 with the speed of the push motor 216 because the push motor 216 alone is responsible for maintaining the speed of the wire feed, and the pull motor 222 is responsible for maintaining a target tension in the welding wire between the pull motor 222 and the push motor 216. By actively controlling the pull motor 222 torque, the tension in the welding wire is actively controlled, thereby reducing or eliminating bird nesting and shaving. Further, the welding torch 122 omits a tachometer because the speed of the pull motor 222 is not controlled.

In the described example, the pull motor 222 load is the friction of the wire in the welding torch 122 plus the added tension to the welding wire. The load on the push motor 216 is the friction from the spool of wire minus the wire tension from the pull motor 222. Although the welding system 100 has been described with control circuitry 212 in the wire feeder controlling the push motor 216 and the pull motor 222, in some aspects of this disclosure, a pull motor controller 226 and current sensor 224 may be located in the welding torch 122 to control the pull motor 222 torque, and a push motor controller located in the wire feeder 106 controls the push motor speed 216. In some aspects of this disclosure, control circuitry 212 is located in the welding torch 122 and may control both the push motor 216 and the pull motor 222. In some aspects of this disclosure, control circuitry 206 in the welding-type power supply 102 may control one of, or both of, the push motor 216 and the pull motor 222.

Figure 3:
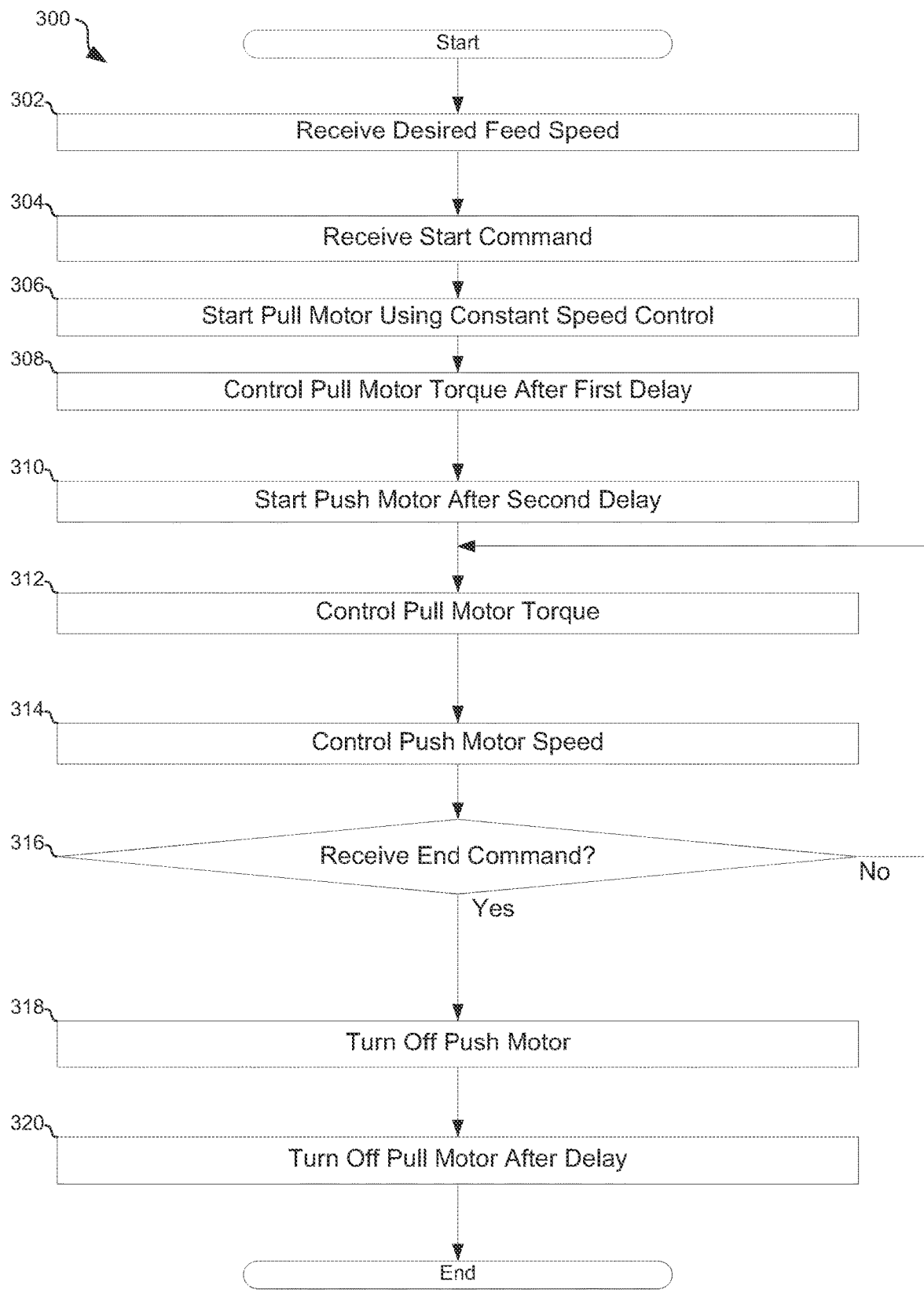
FIG. 3 is a flowchart of an example method of controlling two wire feed motors in accordance with aspects of this disclosure.

FIG. 3 illustrates an exemplary method 300 of feeding welding wire in accordance with aspects of this disclosure. The example method 300 may be implemented by executing machine readable instructions using the example control circuitry 206 and/or the example control circuitry 212 of FIG. 2. The method 300 is described below with reference to the welding system 100 of FIG. 2.

At block 302, control circuitry 212 of the wire feeder 106 receives a command indicating a desired wire feed speed. For example, an operator may input a desired wire feed speed via a user interface 208 of the welding-type power supply 102 or a user interface 210 of the wire feeder 106. Then at block 304, an operator indicates to the wire feeder 106 to start feeding wire. For example, the welding torch 122 may have a trigger, and when an operator pulls the trigger, a signal indicating to start the wire feeding process is sent to the control circuitry 212.

After receiving a start command, at block 306 the control circuitry 212 of the welding torch 122 starts the pull motor 216 at constant velocity. Using an open loop constant speed control at the start allows the pull motor 222 to quickly come up to operational speed.

After a first delay following the reception of the start command at block 304, the control circuitry 212 controls the pull motor 222 torque. This first delay allows the pull motor 222 to come up to operational speed using constant speed control before switching to torque control. To control the pull motor 222 torque, for example, the control circuitry 212 monitors the armature current of the pull motor 222 via the current sensor 224 and controls the pull motor 222 based on the armature current. In some examples, an operator may input, via the user interface 210 or user interface 208, a welding wire type, for example a welding wire material and wire diameter. Control circuitry 212 of the wire feeder (for example pull motor controller 226), may then set the target torque based on the input welding wire type that may be used to set a preset minimum and maximum current via the control circuitry 212. An example method 400 to implement block 308 is described below with reference to FIG. 4a.

At block 310, after a second delay following the reception of the start command at block 304, the control circuitry 212 of wire feeder 106 starts the push motor 216. The push motor 216 is started after the pull motor 222 is started in order to guarantee that the welding wire will be under tension in order to prevent bird nesting. In some examples, the pull motor controller 226 of the control circuitry 212 indicates to the push motor controller 228 of the control circuitry 212 that the pull motor 222 torque is at a preset level (i.e. a level that will prevent bird nesting for the given wire). After receiving this indication, the push motor controller 228 starts the push motor 216.

At block 312, the control circuitry 212 of the welding torch 122 continues to control the pull motor 222 torque. Block 312 may be implemented in the same manner as block 308 and/or via the method 400 of FIG. 4a described below.

At block 314, the control circuitry 212 of the wire feeder 106 controls the push motor 216 to operate at the desired feed speed indicated in block 302. Block 314 may be implemented via the method 418 of FIG. 4b described below.

At block 316 the control circuitry 212 checks to see if an end command has been received, for example if an operator lets go of a trigger coupled to the welding torch 122. If no end command has been received, then the control circuitry 212 continues to control the pull motor 222 torque at block 312 and the push motor 216 speed at block 314.

If an end command is received, then at block 318, the control circuitry 212 of the wire feeder shuts off the push motor 216. Then after a delay, at block 320, the control circuitry 212 shuts off the pull motor 222, Shutting off the pull motor 222 after the push motor 216 ensures that the welding wire remains under tension, which prevents bird nesting when the welding system is restarted. After shutting off the pull motor 222, the example method 300 ends.

Figure 4A:
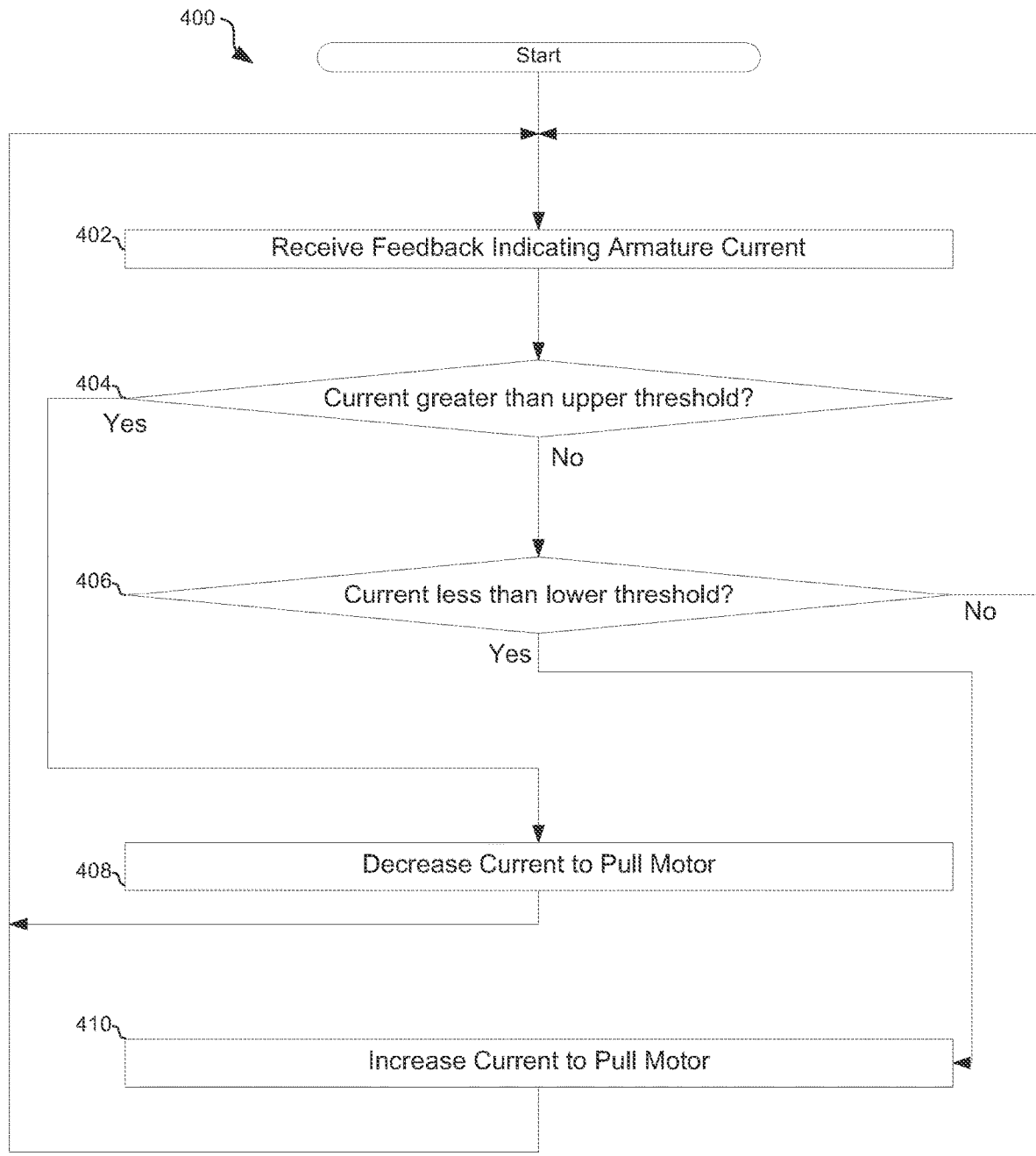
FIG. 4a is a flowchart of an example method of controlling a pull motor torque in accordance with aspects of this disclosure.

FIG. 4a illustrates an example method 400 of controlling the pull motor 222 torque. The example method 400 may be implemented by executing machine readable instructions using the example control circuitry 206 and/or the example control circuitry 212 of FIG. 2. At block 402, the control circuitry 212 receives a feedback signal from the current sensor 224 indicating the current through the armature of the pull motor 222. At block 404, the control circuitry 212 compares the feedback signal to a preset maximum current level. If the feedback signal is not above the preset maximum current, the control circuitry 212 proceeds to block 406. If the feedback signal is above the preset maximum current, then the control circuitry 212 proceeds to block 408.

At block 406, the control circuitry 212 compares the feedback signal to a preset minimum current level. If the feedback signal indicates the current is not above the preset minimum current, the control circuitry 212 returns to block 402. If the feedback signal indicates the current is above the preset maximum current, then the control circuitry 212 proceeds to block 410.

At block 408, in response to determining that the feedback signal indicated that the current through the pull motor 222 armature is too high, the control circuitry 212 decreases the current through the pull motor 222 to decrease the torque, thereby reducing the tension in the welding wire, and thereby preventing shaving. The control circuitry 212 then returns to block 402 to repeat the pull motor 222 torque control loop.

At block 410, in response to determining that the feedback signal indicated that the current through the pull motor 222 armature is too low, the control circuitry 212 increases the current through the pull motor 222 to increase the torque, thereby increasing the tension in the welding wire, and thereby preventing bird nesting. The control circuitry 212 then returns to block 402 to repeat the pull motor 222 torque control loop.

Figure 4B:
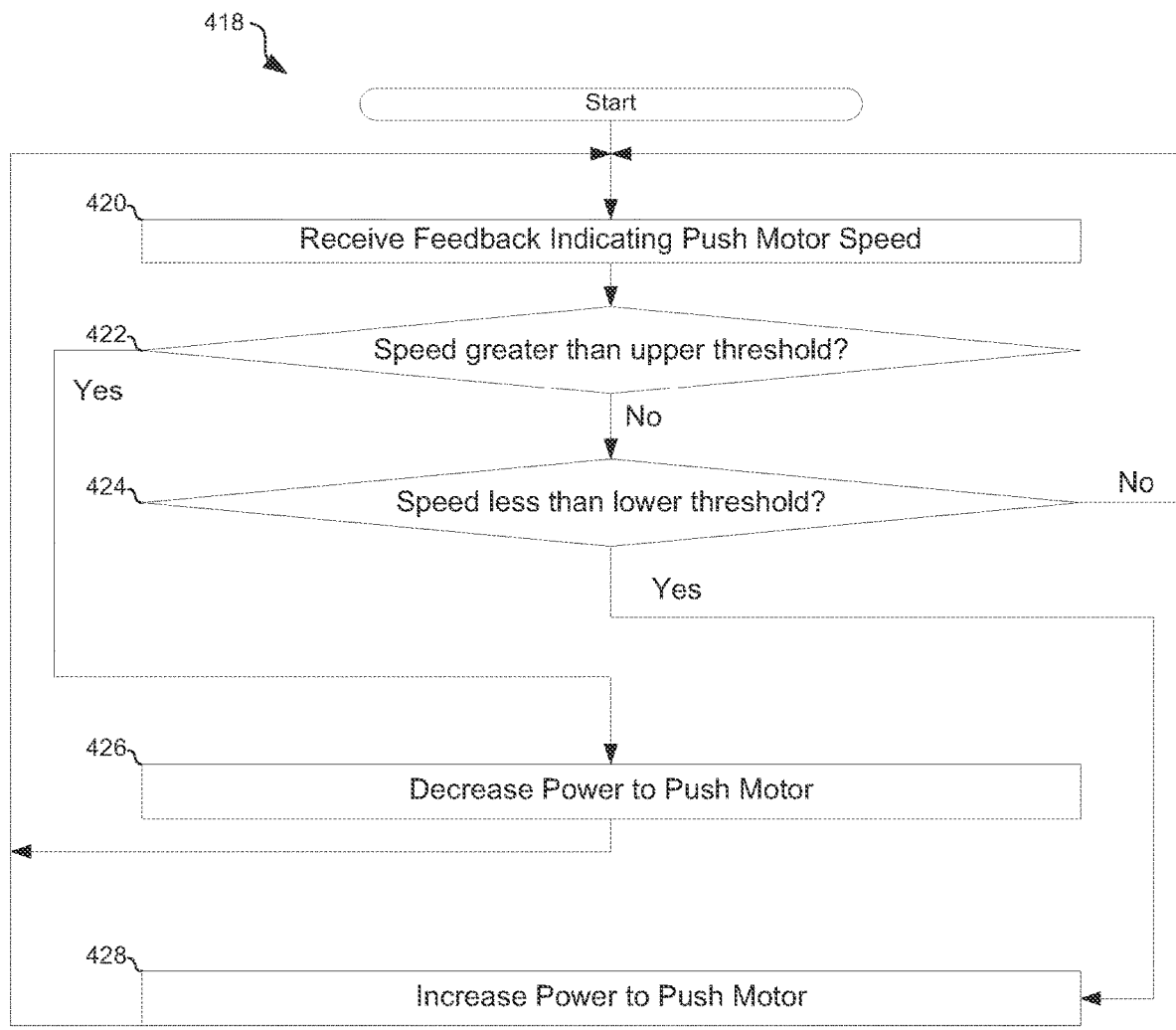
FIG. 4b is flowchart of an example method of controlling a push motor speed in accordance with aspects of this disclosure.

FIG. 4b illustrates an exemplary method 418 for controlling the motor speed of the push motor 216. The example method 300 may be implemented by executing machine readable instructions using the example control circuitry 206 and/or the example control circuitry 212 of FIG. 2. At block 420, the control circuitry 212 of the wire feeder 106 receives feedback from a tachometer 218 indicating the speed of the push motor 216. At block 422, the control circuitry 212 compares the feedback signal to the commanded speed level to determine whether the speed is higher than an upper threshold speed. If the feedback signal indicates the speed of the push motor 216 is not higher than the upper threshold speed, at block 424, the control circuitry 212 compares the feedback signal to the commanded feed speed to determine whether the speed is less than a lower threshold speed. The higher threshold speed and/or the lower threshold speed may be based on a permissible positive and/or negative deviation from the set point speed. If the feedback signal indicates that the speed of the push motor 216 is not less than the lower threshold speed, the control circuitry 212 returns to block 420. If the feedback signal indicates that the speed of the push motor 216 is less than the lower threshold speed, then the control circuitry 212 proceeds to block 428.

At block 426, in response to determining that the feedback signal indicated that the speed of the push motor 216 is higher than the upper threshold speed, the control circuitry 212 decreases the power to the push motor 216 to decrease the speed of the push motor 216, thereby controlling the wire feed speed to the commanded speed. The control circuitry 212 then returns to block 420 to repeat the speed control loop for the push motor 216.

At block 428, in response to determining that the feedback signal indicated that the speed of the push motor 216 is too slow, the control circuitry 212 increases the power to the push motor 216 to increase the speed, thereby controlling the wire feed speed to the commanded speed. The control circuitry 212 then returns to block 420 to repeat the speed control loop for the push motor 216.

In some examples, an operator may update a desired wire feed speed, for example via the user interface 210. In such examples, control circuitry 212 of the wire feeder may also check for received updated speed commands while controlling the push motor 216 speed. If the control circuitry 212 receives an updated speed command, the control circuitry 212 will update the desired speed, and control the wire feed speed accordingly at block 314. In some examples, the target speed may be updated after the predetermined initialization period.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

The term "power" is used throughout this specification for convenience, but also includes related measures such as energy, current, voltage, and enthalpy. For example, controlling "power" may involve controlling voltage, current, energy, and/or enthalpy, and/or controlling based on "power" may involve controlling based on voltage, current, energy, and/or enthalpy. Electric power of the kind measured in watts as the product of voltage and current (e.g., V*I power) is referred to herein as "wattage."

Feedback signal, as used herein, includes one or more signals that provide information about one or more parameters being monitored, such as output current and output voltage.

Welding-type system, as used herein, includes any device capable of supplying power suitable for welding, plasma cutting, induction heating, CAC-A and/or hot wire welding/preheating (including laser welding and laser cladding), including inverters, converters, choppers, resonant power supplies, quasi-resonant power supplies, etc., as well as control circuitry and other ancillary circuitry associated therewith.

Welding-type power supply, as used herein, refers to a power supply that can provide welding-type power.

Welding operation, as used herein, includes both actual welds resulting in joining, such as welding or brazing) of two or more physical objects, an overlaying, texturing, and/or heat-treating of a physical object, and/or a cut of a physical object) and simulated or virtual welds (e.g., a visualization of a weld without a physical weld occurring).

Control circuitry, as used herein, includes digital and analog circuitry, discrete or integrated circuitry, microprocessors, DSPs, etc., software, hardware and firmware, located on one or more boards, that form part or all of a controller, and are used to control a welding process, or a device such as a power source or wire feeder.

As utilized herein the terms "circuits" and "circuitry" refer to physical electronic components, any analog and/or digital components, power and/or control elements, such as a microprocessor or digital signal processor (DSP), or the like, including discrete and/or integrated components, or portions and/or combination thereof (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code.

As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding system comprising:
   a wire feeder comprising a push motor configured to feed a welding wire to a welding torch having a pull motor configured to pull the welding wire;
   a sensor configured to output a feedback signal representative of a current through the pull motor; and
   control circuitry configured to, during a welding operation:
      control the pull motor to operate at a target torque based on the feedback signal; and
      control the push motor to operate at a target speed.

2. The welding system of claim 1, wherein both the push motor and the pull motor are brushed DC motors.

3. The welding system of claim 2, wherein the control circuitry is configured to control a power level applied to the push motor based on a second feedback signal indicative of the push motor speed.

4. The welding system of claim 3, further comprising a tachometer coupled to the push motor, and wherein the control circuitry is configured to receive the second feedback signal from the tachometer.

5. The welding system of claim 1, wherein the control circuitry is further configured to:
   receive an input indicating a desired wire feed speed, and
   adjust the target speed based on the input.

6. The welding system of claim 1, wherein the control circuitry is further configured to:
   receive an input indicating a welding wire type; and
   adjust the target torque based on the input.

7. The welding system of claim 1, further comprising a welding-type power supply configured to:
   provide power to the push motor and the pull motor; and
   provide welding-type power to the welding torch.

8. A welding system comprising:
   a wire feeder comprising a push motor configured to feed a welding wire to a welding torch having a pull motor configured to pull the welding wire;
   a sensor configured to output a feedback signal representative of a current through the pull motor; and
   control circuitry configured to:
      receive a start command;
      in response to receiving the start command, start the pull motor at a constant speed;
      after a first delay following receiving the start command, control the pull motor to operate at a target torque based on the feedback signal; and
      after a second delay following receiving the start command, start and control the push motor at a target push motor speed.

9. The welding system of claim 8, wherein the control circuitry is further configured to:
   receive an end command; and
   in response to receiving the end command:
      turn off the push motor; and
      after a third delay following turning off the push motor, turn off the pull motor.

10. The welding system of claim 8, wherein both the push motor and the pull motor are brushed DC motors.

11. The welding system of claim 8, wherein the control circuitry is further configured to:
   receive a second feedback signal indicative of the push motor speed; and
   adjust a power level applied to the push motor in response to the feedback signal to maintain the target push motor speed.

12. The welding system of claim 11, further comprising a tachometer coupled to the push motor, and wherein the control circuitry receives the feedback signal indicative of the push motor speed from the tachometer.

13. The welding system of claim 9, wherein the control circuitry is configured to control an armature current of the pull motor to control the pull motor to operate at the target torque.

14. The welding system of claim 8, wherein the control circuitry comprises a first controller configured to control the push motor, and a second controller to control the pull motor.

15. The welding system of claim 8, wherein the control circuitry is further configured to:
receive an input indicating a desired wire feed speed prior to receiving the start command, and wherein the target speed is based on the input.

16. The welding system of claim 15, wherein the control circuitry is further configured to:
after second delay, receive a second command indicating a desired wire feed speed, and
adjust the target speed in response to receiving the second command.

17. A method for feeding welding wire, the method comprising:
controlling, via control circuitry, a push motor to operate at a target speed, wherein the push motor feeds the welding wire to a welding torch having a pull motor that pulls the welding wire;
providing, via a sensor, a feedback signal representative of a current through the pull motor; and
controlling, via the control circuitry, the pull motor to operate at a target torque based on the feedback signal.

18. The method of claim 17, further comprising:
providing, via a second sensor, a second feedback signal representative of the push motor speed; and
controlling, via the control circuitry, a power level applied to the push motor based on a second feedback signal indicative of the push motor speed.

19. The method of claim 18, further comprising:
receiving, via the control circuitry, an input indicating a desired wire feed speed; and
adjusting, via the control circuitry, the target speed based on the input.

20. The method of claim 18, further comprising:
receiving, via the control circuitry, an input indicating a welding wire type; and
adjusting, via the control circuitry, the target torque based on the input.

\* \* \* \* \*